United States Patent
Bryant et al.

(10) Patent No.: US 7,853,543 B2
(45) Date of Patent: Dec. 14, 2010

(54) BLOCK ALLOCATION TIMES IN A COMPUTER SYSTEM

(75) Inventors: Jay Symmes Bryant, Rochester, MN (US); Daniel Paul Kolz, Rochester, MN (US); Dharmesh J. Patel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 12/191,333

(22) Filed: Aug. 14, 2008

(65) Prior Publication Data

US 2008/0313432 A1 Dec. 18, 2008

Related U.S. Application Data

(63) Continuation of application No. 11/316,247, filed on Dec. 22, 2005, now Pat. No. 7,516,108.

(51) Int. Cl.
G06F 17/00 (2006.01)
G06N 5/00 (2006.01)

(52) U.S. Cl. .............................. 706/45; 706/21; 706/14

(58) Field of Classification Search ........................ None
See application file for complete search history.

(56) References Cited

U.S. PATENT DOCUMENTS 7,533,168 B1 5/2009 Pabla et al.

2006/0149714 A1 7/2006 Fellenstein et al.

OTHER PUBLICATIONS

Allsopp et al., N., "Unfolding the IBM eServer Blue Gene Solution", IBM Redbooks, Sep. 2005.*
Barnard et al., E., "Blue Gene/L: System Administration", IBM Redbooks, Nov. 2005.*
Kannan et al., S., "Workload Management with LoadLeveler", IBM Redbooks, Nov. 2001.*
Allen et al., F., "Blue Gene: A vision for protien science using a petaflop supercomputer", Systems Journal, vol. 40, No. 2, 2001.*
Almasi et al., G., "An Overview of the Blue Gene/L System Software Organization", Euro-Par 2003, pp. 543-555, 2003.*
Almasi et al., G., "The Design and Implementation of Message Passing Services for the BlueGene/L Supercomputer", IBM Journal of Research and Development, pp. 1-22, Mar. 2003.*

(Continued)

*Primary Examiner*—Michael B. Holmes
*Assistant Examiner*—Adrian L Kennedy
(74) *Attorney, Agent, or Firm*—Martin & Associates, LLC; Bret J. Petersen

(57) ABSTRACT

A method and apparatus improves the block allocation time in a parallel computer system. A pre-load controller pre-loads blocks of hardware in a supercomputer cluster in anticipation of demand from a user application. In the preferred embodiments the pre-load controller determines when to pre-load the compute nodes and the block size to allocate the nodes based on pre-set parameters and previous use of the computer system. Further, in preferred embodiments each block of compute nodes in the parallel computer system has a stored hardware status to indicate whether the block is being pre-loaded, or already has been pre-loaded. In preferred embodiments, the hardware status is stored in a database connected to the computer's control system. In other embodiments, the compute nodes are remote computers in a distributed computer system.

3 Claims, 5 Drawing Sheets

OTHER PUBLICATIONS

Allsopp et al., Nicholas, "Unfolding the IBM eServer Blue Gene Solution", Sep. 2005.
Barnard et al., "Blue Gene/L: System Administration", Nov. 2005.
Kannan et al., Subramanian, "Workload Management with LoadLeveler", Nov. 2001.

* cited by examiner

BLOCK ALLOCATION TIMES IN A COMPUTER SYSTEM

CROSS-REFERENCE TO PARENT APPLICATION

This patent application is a continuation of U.S. Ser. No. 11/316,247 filed on Dec. 22, 2005, which is incorporated herein by reference.

BACKGROUND OF THE INVENTION

1. Technical Field

This invention generally relates to computer systems and development, and more specifically relates to improving the block allocation time in a supercomputer or distributed computer system via system image and data file pre-loading.

2. Background Art

Supercomputers continue to be developed to tackle sophisticated computing jobs. These computers are particularly useful to scientists for high performance computing (HPC) applications including life sciences, financial modeling, hydrodynamics, quantum chemistry, molecular dynamics, astronomy and space research and climate modeling. Supercomputer developers have focused on massively parallel computer structures to solve this need for increasingly complex computing needs. A family of such massively parallel computers is being developed by International Business Machines Corporation (IBM) under the name Blue Gene. The Blue Gene/L system is a scalable system in which the current maximum number of compute nodes is 65,536. The Blue Gene/P system is a scalable system in which the maximum projected number of compute nodes is 73,728. The Blue Gene/P node consists of a single ASIC (application specific integrated circuit) with 4 CPUs and memory. The full computer would be housed in 72 racks or cabinets with 32 node boards in each.

In the Blue Gene supercomputers, and other supercomputers, the compute nodes are arranged in clusters of compute and I/O nodes that communicate over a service network to a control system in a service node. One or more clusters of computer hardware are allocated into a block to run a software application. The compute and I/O nodes have volatile memory for their operating systems that must be loaded via the service network each time a block of hardware is allocated for a software application to be run. This prior art approach to block allocation results in each job taking longer to run as system time is used loading the operating system images to the hardware, allowing the I/O node and compute node kernels to complete their boot and then all the hardware reporting to the control system. It is only after this process has completed that the control system may begin the process of loading the application or job to the block for execution. On a massively parallel super computer system like Blue Gene, utilization of the system is important due to the high cost of the overall system. Thus it is advantageous to be able to decrease the overall system down time by reducing the block allocation time.

Distributed computer systems have a similar overall architecture as a massively parallel computer system. However, instead of a set of possibly identical compute nodes interconnected in a single location, the distributed computer has a number of compute nodes that may not be homogeneous and may be remotely located. A distributed computer system can have a similar problem as described above in that work cannot be allocated to a distributed compute node or block of nodes until the compute entity has system and data files necessary for performing designated tasks.

Without a way to reduce the block allocation time, super computers and distributed computers will continue to need to wait to load operating system images and data files into all hardware blocks before proceeding with the process of loading applications thereby wasting potential computer processing time.

DISCLOSURE OF INVENTION

According to the preferred embodiments, a method and apparatus improves the block allocation time in a computer system. In the preferred embodiments each block of compute nodes in the parallel computer system have a stored hardware status to indicate whether the block is being pre-loaded, or already has been pre-loaded. In the preferred embodiments, the hardware status is stored in a database in the computer's control system. Further, preferred embodiments include a pre-load controller that determines when to pre-load the compute nodes and the block size to allocate the nodes based on pre-set parameters and previous use of the computer system.

The parallel computer embodiments are described with respect to the Blue Gene architecture but can be implemented on any parallel computer system with multiple processors arranged in a network structure. The preferred embodiments are particularly advantageous for massively parallel computer systems. Other embodiments are described with a distributed computer system architecture.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention relates to an apparatus and method for improving the block allocation time in a parallel or distributed computer system. A pre-load controller pre-loads blocks of hardware in a computer cluster in anticipation of demand from a user application. In the preferred embodiments the pre-load controller determines when to pre-load the compute nodes and the block size to allocate the nodes based on preset parameters and previous use of the computer system. Further, in preferred embodiments each block of compute nodes in the parallel computer system has a stored hardware status to indicate whether the block is being pre-loaded, or already has been pre-loaded. In preferred embodiments, the hardware status is stored in a database connected to the computer's control system. The preferred embodiments will be described with respect to Blue Gene/P massively parallel computer being developed by International Business Machines Corporation (IBM). The term massively parallel as used herein will mean more than a few processors in a parallel computer system.

Figure 1:
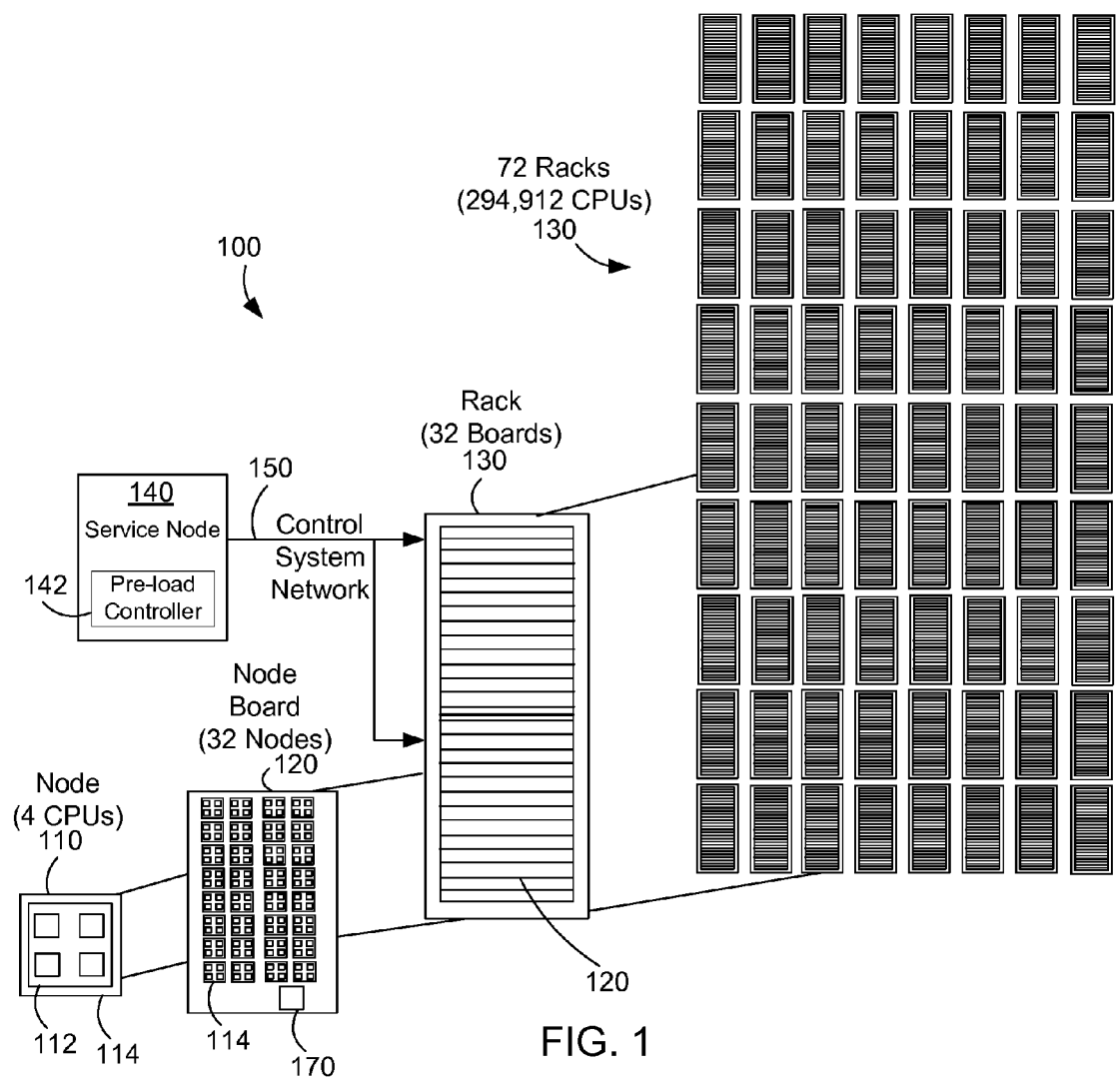
FIG. 1 is a block diagram of a massively parallel computer system according to preferred embodiments.

FIG. 1 shows a block diagram that represents a massively parallel computer system 100 such as the Blue Gene/P computer system. The Blue Gene/P system is a scalable system in which the maximum number of compute nodes is 73728. Each node 110 consists of a single application specific integrated circuit (ASIC) 112 with 4 CPUs and memory on a node daughter card 114. Each node 110 typically has 512 megabytes of local memory. A node board 120 accommodates 32 node daughter cards 114 each having a node 110. Thus, each node board has 32 nodes, with 4 processors for each node, and the associated memory for each processor. A rack 130 is a housing that contains 32 node boards 120. The full Blue Gene/P computer system would be housed in 72 racks 130 or cabinets with 32 node boards 120 in each. The full system would then have 294,912 CPUs (72 racks×32 node boards×32 nodes×4 CPUs). As used herein, the term compute node means a compute resource with one or more CPUs and is not limited to the architecture of the described embodiments.

Again referring to FIG. 1, the computer system 100 includes a service node 140 that handles the loading of the nodes with software and controls the operation of the whole system. The service node 140 is typically a mini computer system that includes a control console (not shown). The service node 140 is connected to the racks 130 of compute nodes with a control system network 150. The service node 140 includes a pre-load controller 142 according to preferred embodiments and described further below. The control system network 150 includes various networks that provide the necessary communication for the massively parallel computer system. The network interfaces are described further below.

The Blue Gene/P supercomputer communicates over several communication networks. An I/O processor located on some of the node boards 120 handle communication from the service node 160 to a number of nodes over these networks. The 73,728 computational nodes and 1024 I/O processors are arranged into both a logical tree network and a logical 3-dimensional torus network. The torus network logically connects the compute nodes in a lattice like structure that allows each compute node 110 to communicate with its closest 6 neighbors. Further, the Blue Gene/P computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the tree network and also have functional wide area network capabilities through a gigabit Ethernet network.

Figure 2:
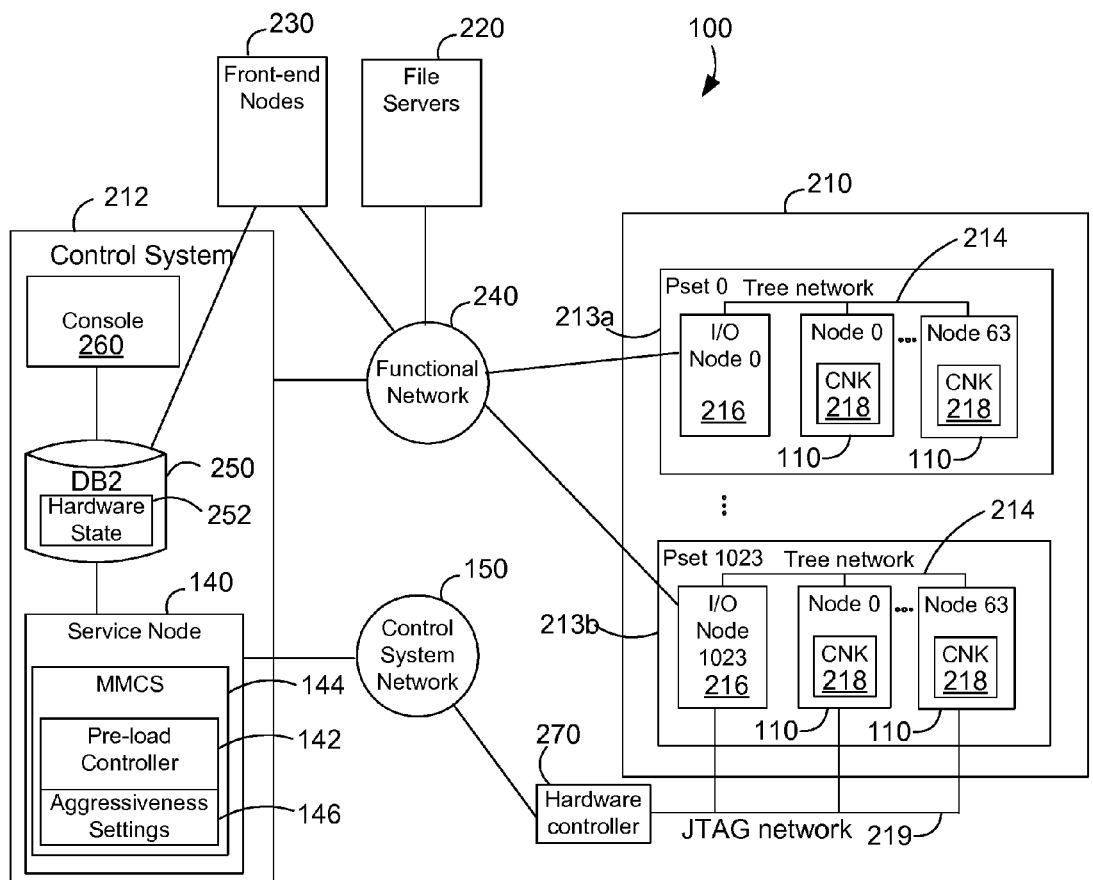
FIG. 2 is another system block diagram of a massively parallel computer system according to preferred embodiments.

FIG. 2 shows another block diagram that represents another way to view the system architecture of the Blue Gene/P computer system to illustrate further details of the preferred embodiments. FIG. 2 includes a representation of all the compute nodes 110 of the computer system 100 as a compute core 210 connected to the control system 212 of the computer system 100. The compute core 210 communicates with the service node 140 of the control system 212 over the control system network 150 as described briefly above with reference to FIG. 1. The compute core 210 is connected to the control system network 150 through a hardware controller 270 that is connected to each I/O node 216 and compute node 110 through the JTAG network 219. The hardware controller 270 resides in the rack 130 (FIG. 1) and provides an interface for the control system 212 to configure the compute nodes 110 and load data into the compute nodes' memory. In the Blue GeneL computer system, the hardware controller 270 is called the "IDochip".

Further, as shown in FIG. 2, the compute core 210 also communicates with file servers 220 and front end nodes 230 over a functional network 240. The file servers 220 store data for user applications and system images. The front end nodes 230 hold compilers and programs for user interaction with the computer system 100. The control system 212 includes a database, called "DB2" 250 connected to the front-end nodes 230 and the service node 140. The DB2 holds block tables and other hardware information used by the mid-plane management and control system (MMCS) 144 in the service node 140. The MMCS 144 is responsible for controlling the allocation of hardware in the compute core 210. In the preferred embodiments, the MMCS 144 includes a pre-load controller 142 to pre-load compute nodes with system and data files as described further below. In preferred embodiments, the pre-load controller 142 includes aggressiveness settings 146 also described below. In the preferred embodiments herein, the DB2 250 holds the hardware state 252 of blocks of compute nodes 110 as described further below. The control system 212 is also connected to the functional network 240. In the preferred embodiments, this connection allows the control system to detect when a hardware block has completed the boot process after being loaded with system images and data files as described below. The control system 212 further includes a console 260 for use by system administrators.

Again referring to FIG. 2, the compute core 210 illustrates the compute nodes 110 housed in racks 130 (FIG. 1). The compute nodes are grouped in 1024 psets that are illustrated by representation, where Pset0 213a and Pset1023 213b are shown explicitly and the remaining (Pset 1 through Pset 1022) are implied. A Pset is a group of 64 nodes that are grouped together in a set for communication with an I/O node 216. The I/O node 216 provides communication over the functional network and other networks to the compute nodes 110 in the pset. In the Blue Gene/P system, an I/O node 216 communicates with between 8 and 128 compute nodes 110, represented by Node0 and Node63. The nodes 110 are connected by a tree network 214 as shown and described briefly above.

Again referring to FIG. 2, each compute node 110 includes system image and data files 218 stored in local memory of the compute node 110. The system image files include system files such as an operating system kernel. The system image files 218 with the operating system kernel are stored in the volatile memory of the compute node and must be loaded with the needed software and allocated into a block before the compute node can be utilized. In the preferred embodiments the operating system kernel is pre-loaded as described further below to improve the block allocation time in the supercomputer.

In the Blue Gene/P super computer, each rack is divided into two midplanes with a service card providing communication from the service node 140 to each midplane. The midplanes each have half of the racks 32 node boards 120. In the Blue Gene/P computer system the midplane is the basic granule size of a cluster of compute nodes and I/O nodes.

When a cluster of hardware (one or more midplanes) is being utilized together to run a software application it is called a block. Thus, one or more midplanes of hardware can be allocated to a block.

When a user sets up an application to run on the computer system, a request is made to the service node 140 to allocate a cluster of computer hardware into a block to run the software application. Since the compute and I/O nodes have volatile memory for their operating systems they must be loaded with the proper software and the hardware allocated prior to the application being able to run. In the prior art approach the block allocation was done after the request by the application. In contrast, in the preferred embodiments, the blocks are pre-loaded with system software prior to the request by the application by a pre-load controller located in the service node 140. Further, in the preferred embodiments, new hardware states are assigned to the blocks of compute nodes 110 and I/O nodes 216. The hardware states 252 are stored in the DB2 250. The prior art hardware included the states, 'F' for free or available or 'M' for missing and 'I' for initialized.

Figure 3:
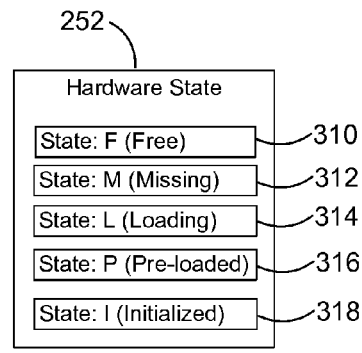
FIG. 3 is a block diagram of a hardware state register in a massively parallel computer system according to preferred embodiments.

FIG. 3 illustrates the hardware states according to the preferred embodiments. The hardware states 252 stored in the DB2 table include the prior art states of A 310, M 321 and I 318, and also include the states "loading", state L 314 and "pre-loaded", state P 316. The new states L and P are assigned to any hardware that was in the process of being Loaded or had been successfully Pre-loaded. These new states are utilized by the control system to run jobs more efficiently by pre-loading the system software in the compute nodes 110. In the prior art, after the hardware has been loaded and allocated to a user it is changed to the 'I' state 318 to wait for a user request. In contrast, in the preferred embodiments, the hardware is pre-loaded and set to the 'P' state 316, then the hardware state is changed to the 'I' state 318 when the block is allocated to a user.

In preferred embodiments, the pre-load controller of the computer 100 watches for opportunities to pre-load computer resources or hardware. The pre-load controller periodically searches the system for computer resources or hardware such as compute nodes that are currently available and are not currently associated with a block. When free resources are found, the pre-load controller checks the current workload being exerted upon the computer system and checks the recent level of demand to run jobs. These variables are used to determine the best time for the control system to pre-load any free resources or hardware so that it will be loaded before the next user requests another block but is unlikely to slow the progress of other jobs being run. When a computer resource or hardware is pre-loaded, the hardware state 252 is changed in the DB2 250 and placed in a hardware pool. The hardware pool can be considered the collection of resources or hardware with the pre-loaded hardware state 252. Computer resources as used herein means physical hardware or virtual hardware.

Figure 4:
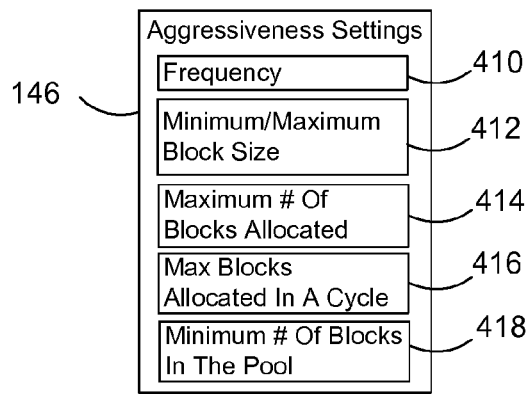
FIG. 4 is a block diagram of aggressiveness settings associated with the pre-load controller in a massively parallel computer system according to preferred embodiments.

In preferred embodiments, the level of aggressiveness used by the pre-load controller to pre-load hardware is tunable by the user. FIG. 4 illustrates several examples of aggressiveness setting 146 associated with the pre-load controller 142. These settings are set up by a system administrator through the service node 140 (FIG. 1). The frequency aggressiveness settings 410 sets the frequency or time between invocations of the pre-load controller to look for available hardware. The minimum/maximum block size aggressiveness settings 412 sets a minimum and maximum block size for the pre-load controller to allocate and load into the pre-loaded hardware pool. The minimum/maximum block size aggressiveness setting 421 will supersede the historical block size determined by the pre-load controller as described below. The maximum number of blocks allocated 414 sets the maximum number of blocks allocated to the hardware pool before the pre-load controller stops trying to allocate blocks. The maximum blocks allocated in a cycle 416 sets the maximum number of blocks allocated on a single invocation of the pre-load controller to control the amount of load the pre-load controller puts on the system. The minimum number of blocks in a pool 418 sets a minimum (goal) number of blocks that are desired in the pool of pre-loaded blocks. If the pool is below the set value it causes the pre-load controller to search for free hardware more frequently.

In preferred embodiments, the pre-load controller determines blocks of hardware which are likely to be repeatedly requested based on previous demand to automatically adjust the hardware's pre-load configuration and eligibility. For example, if the user has frequently requested 128 node blocks in the past, a group of 512 free compute nodes would be pre-loaded as 4, 128 nodes blocks whereas it would be loaded as one 512 node block on a system where blocks of this size are more frequently requested. Hardware that is in the process of being loaded is marked accordingly and after the loading process has completed it is marked as successfully pre-loaded. For hardware that was successfully pre-loaded the control connections would be temporarily assigned to the control system to prevent the hardware from being taken over by another user.

Figure 5:
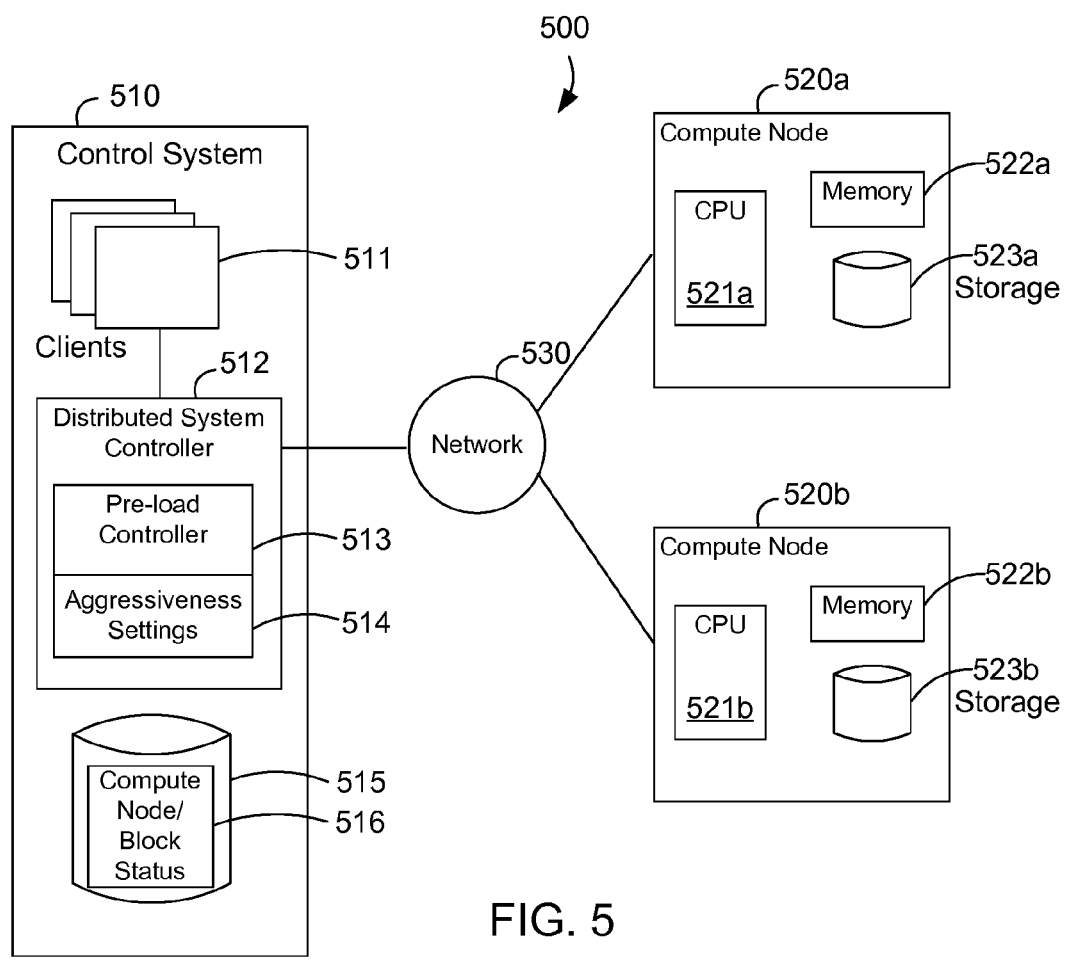
FIG. 5 is a system block diagram of a distributed computer system according to preferred embodiments.

FIG. 5 shows a system block diagram of a distributed computer system 500 according to preferred embodiments herein. In one specific distributing computing environment, a group of remotely located computers are harnessed together to work together in a similar fashion as described above in the Blue Gene computer examples. In the distributed computer system the compute nodes are more remotely located and may not have a homogeneous nature since the distributed computers may be of different types. However, the architecture is quite similar with respect to the described Blue Gene examples. In the distributed computer system, there are multiple computers that comprise the compute nodes that are controlled by a control system and interconnected by a network. The distributed computer system can similarly benefit from having the control system include a pre-load controller that pre-loads available hardware with system image and/or data files prior to a request for resources. In the distributed computer system the system image files and data files may be different to account for the differences in the different computer platforms in the distributed computer system.

Again referring to FIG. 5, a distributed control system 500 is illustrated according to preferred embodiments herein. The distributed computer system 500 includes a control system 510 connected to a number of compute nodes 520*a*, 520*b* over a network 530. The compute nodes 520*a*, 520*b* represent multiple computers of various types that may be interconnected in the distributed computer 500. The compute nodes 520*a*, 520*b* each have a CPU 521*a*, 521*b*, a local memory 522*a*, 522*b* and a storage facility 523*a*, 523*b*. The network 530 may be any type of network used in a distributed computer system. The control system 510 may be centrally located in a single computer of the distributed computer system 500 or the control system may also be distributed over multiple computers (not shown). The control system 510 has multiple clients 511 that request access to computer resources. The clients 511 include software applications that may be located locally or distributed (not shown).

Again referring to FIG. 5, the control system 510 includes a distributed system controller 512 that controls the flow of work to the compute nodes to service request from the clients 511. The distributed system controller according to preferred embodiments operates similar to prior art distributed system controllers but includes a pre-load controller 513 that operates as described above with reference to the parallel computer system. The pre-load controller 513 includes aggressiveness settings 514 as described above with reference to FIG. 4. The control system 510 includes a storage facility 515 for storing the status 516 of compute nodes 520a, 520b. In contrast to the parallel computer system where a block is not likely to include a single node, in the distributed computer embodiment, the pre-load controller may allocate a single node in a block, so the status 516 stored for a block may include a single node. In most respects, embodiments directed to the distributed computer system operates in the same manner as described above with reference to the parallel computer system embodiments.

Figure 6:
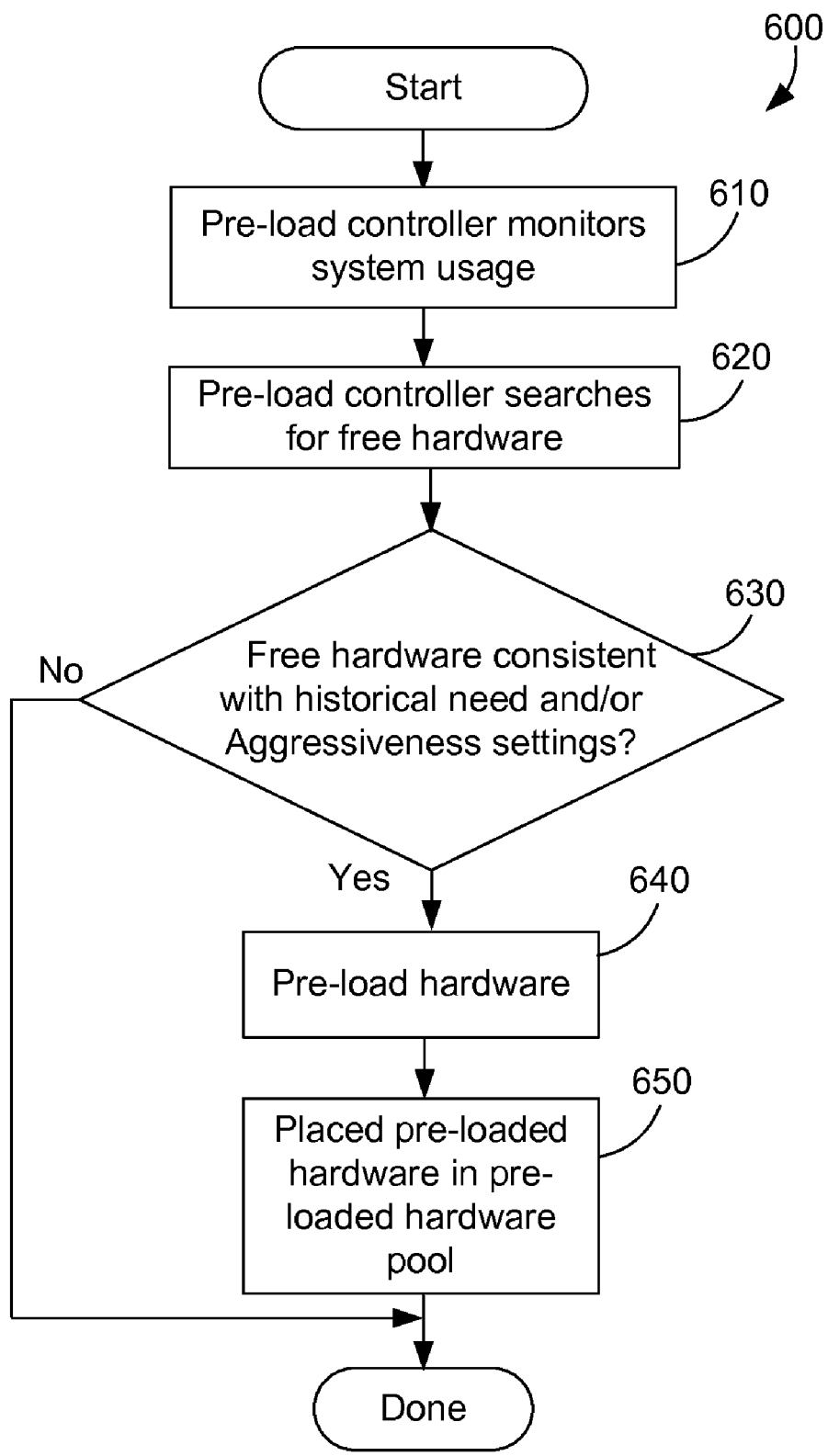
FIG. 6 is a method flow diagram for improving block allocation times according to a preferred embodiment.

FIG. 6 shows a method 600 for improving block allocation times in a massively parallel computer system according to embodiments herein. In the preferred embodiments, the sequence of steps of method 600 is initiated by MMCS 144 control system software on a periodic basis to perform the tasks as described. The pre-load controller monitors system usage such as block size and stores this historical data (step 610). The pre-load controller also periodically searches for free hardware that is available to pre-load in anticipation of user requests for hardware (step 620). Free hardware that is found is checked to determine if it is of sufficient size that it can be allocated consistent with the historical need of user requests for hardware and/or the aggressiveness settings (146 in FIG. 4) (step 630). If the free hardware is not consistent with the historical need for hardware or the aggressiveness settings (step 630=no) then the method is done until the next periodic cycle. If the free hardware is consistent with the historical need for hardware and/or the aggressiveness settings (step 630=yes) then the free hardware is pre-loaded (step 640) and pre-loaded hardware is placed in a pre-loaded hardware pool to satisfy future user requests for hardware (step 650).

Figure 7:
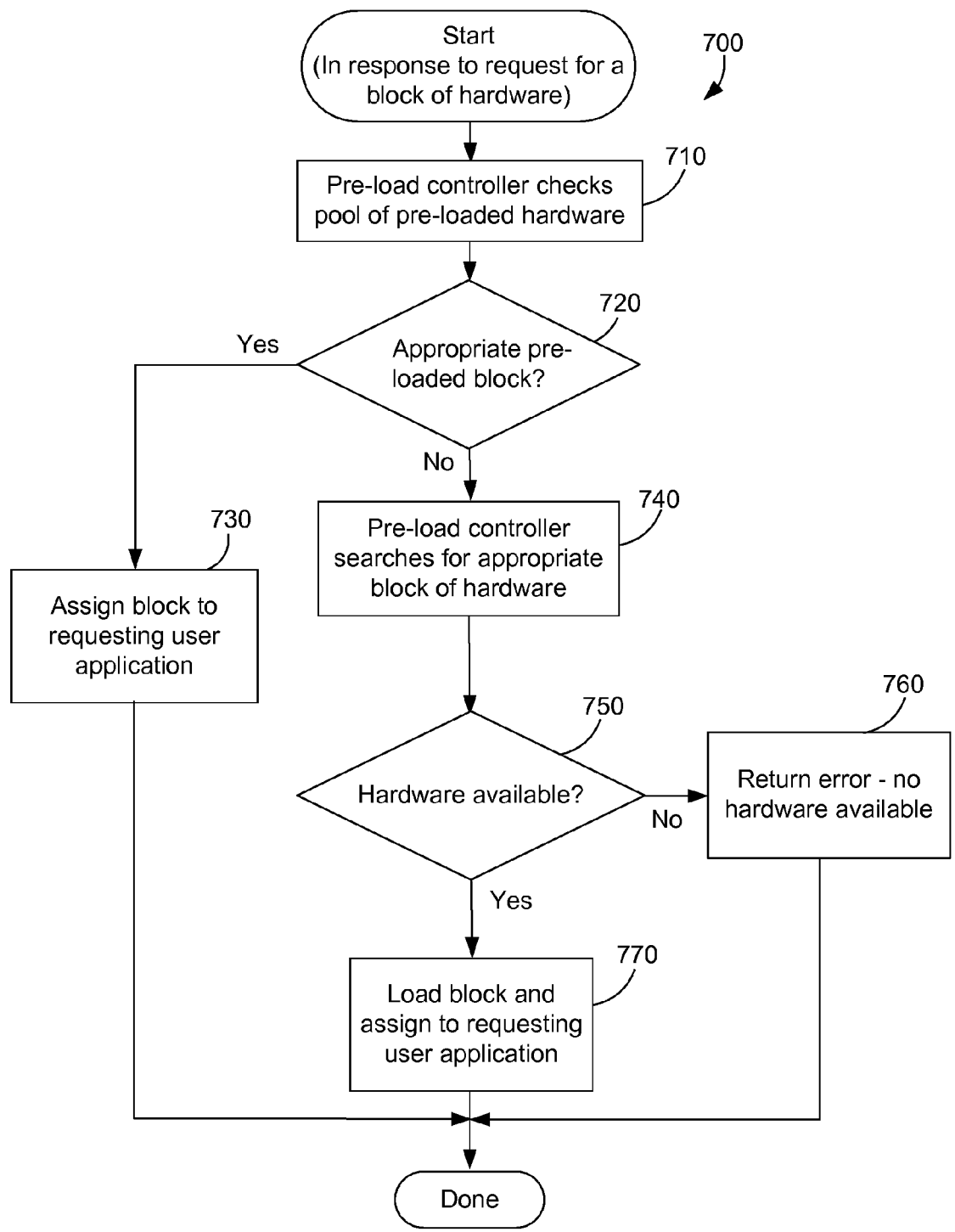
FIG. 7 is another method flow diagram for improving block allocation times according to a preferred embodiment.

FIG. 7 shows another method 700 for improving block allocation times in a massively parallel computer system according to embodiments herein. In the preferred embodiments, the sequence of steps of method 700 is initiated in response to a request for a block of hardware from a user application. In response to this request, the pre-load controller is launched to check the pool of pre-loaded hardware (step 710). If there is an appropriate block of pre-loaded hardware (step 720=yes) then the pre-load controller assigns the available pre-loaded hardware block to the requesting user application (step 730) and then the method is done. If there is not an appropriate block of pre-loaded hardware (step 720=no) then the pre-load controller searches for an appropriate block of hardware (step 740). If there is no appropriate hardware available for the user application's request (step 750=no) then an error is returned to the user application that no hardware is available (step 760) and the method is done. If there is appropriate hardware available for the user application's request (step 750=yes), then the appropriate block size of hardware is loaded with a system image and the block assigned to the requesting user application (step 770). And the method is then done.

As described above, embodiments provide a method and apparatus for improving block allocation times in a massively parallel super computer system. Embodiments herein can significantly decrease the amount of down time for increased efficiency of the computer system by providing a pre-load controller with a dynamic ability to pre-load hardware. Blocks of compute and I/O nodes are allocated as they become available and as control system resources allow. The hardware can then be dynamically associated as blocks that satisfy the user's hardware needs when the request from the user's application is received. From the user's perspective the only latency perceived when requesting to run a job is the time required to collect the pre-loaded hardware into a block, associate the block with the user and submit the requested job. This simple process would take much less time than prior art systems that require the operating system images to be loaded and booted after the hardware is requested.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A computer system comprising:
 a plurality of compute nodes that are allocated into a compute resource block, wherein each of the plurality of compute nodes include a volatile memory for holding a system image file which includes an operating system kernel;
 a control system connected to the compute nodes through a network that manages the loading of corresponding system image files into the plurality of compute nodes;
 a pre-load controller that loads the corresponding system image files and a data file into each of the plurality of compute nodes prior to a request for the compute resource block;
 a hardware status stored for each compute resource block to indicate whether the corresponding compute resource block is presently being pre-loaded or has been pre-loaded and the hardware status includes a status selected from the following: "loading" and "pre-loaded"; and
 wherein the pre-load controller allocates available blocks of hardware and pre-loads the system image files based on the prior history of requests for hardware from applications running on the computer system, and based on the prior history of hardware use by user applications running on the computer system and based on aggressiveness settings set by a system administrator of the computer system.

2. A massively parallel computer system comprising:
 a plurality of compute nodes that are allocated into a compute resource block for use by a user application, wherein the plurality of compute nodes include a volatile memory for holding a system image file which includes an operating system kernel;
 a service node connected to the compute nodes through a control system network that manages the loading of the system image file into the compute nodes;
 a hardware status stored for each compute resource block to indicate whether the corresponding compute resource block is presently being pre-loaded or has been pre-loaded; and
 a pre-load controller that loads the system image files and a data file into the compute nodes prior to a request for the computer resource block by the user application; and
 wherein the pre-load controller allocates available blocks of hardware and pre-loads the system image files based on the prior history of requests for hardware from applications running on the computer system, and based on the prior history of hardware use by user applications running on the computer system and based on aggressiveness settings set by a system administrator of the computer system where the aggressiveness settings are chosen from the following: frequency of searching for available hardware, minimum and maximum block size, maximum number of blocks to allocate, the maximum number of blocks to allocate in a cycle, and the minimum desired number of blocks in the pool.

3. A distributed computer system comprising:

a plurality of compute nodes that are allocated into a compute resource block, wherein the plurality of compute nodes include memory for holding system and data files which includes an operating system kernel;

a control system connected to the compute nodes through a network that manages the loading of the system and data files into the compute nodes;

a pre-load controller that loads the system and data files into the compute nodes prior to a request for the computer resource block;

a hardware status stored for each compute resource block to indicate whether the corresponding compute resource block is presently being pre-loaded or has been pre-loaded; and wherein the pre-load controller allocates available blocks of hardware and pre-loads the system image files based on the prior history of requests for hardware from applications running on the computer system, and based on the prior history of hardware use by user applications running on the computer system and based on aggressiveness settings set by a system administrator of the computer system where the aggressiveness settings are chosen from the following: frequency of searching for available hardware, minimum and maximum block size, maximum number of blocks to allocate, the maximum number of blocks to allocate in a cycle, and the minimum desired number of blocks in the pool.

* * * * *